US008109565B2

(12) United States Patent
Waters et al.

(10) Patent No.: US 8,109,565 B2
(45) Date of Patent: Feb. 7, 2012

(54) AUTOMOTIVE SEAT RECONFIGURABLE TO WORK DESK

(75) Inventors: John E. Waters, Fortville, IN (US); Daniel A. Friedman, Zionsville, IN (US); David B. Busch, Fishers, IN (US); Rollin Nothwehr, Holland, MI (US); Jonathan Peter Cansfield, Dexter, MI (US); Emery Jay Zadina, Ypsilanti, MI (US)

(73) Assignees: Bright Automotive, Inc., Anderson, IN (US); Johnson Controls Technology Company, Holland, MI (US)

( * ) Notice: Subject to any disclaimer, the term of this patent is extended or adjusted under 35 U.S.C. 154(b) by 187 days.

(21) Appl. No.: 12/271,194

(22) Filed: Nov. 14, 2008

(65) Prior Publication Data

US 2010/0123338 A1 May 20, 2010

(51) Int. Cl.
*A47B 85/04* (2006.01)
(52) U.S. Cl. ........ 297/125; 297/129; 297/335; 297/336; 108/44
(58) Field of Classification Search .................. 297/119, 297/124, 125, 126, 188.1, 331, 334, 335, 297/336, 129; 296/24.44, 37.15; 108/44
See application file for complete search history.

(56) References Cited

U.S. PATENT DOCUMENTS

| 4,390,205 A * | 6/1983 | Louis ........................ 297/334 X |
| 4,832,241 A | 5/1989 | Radcliffe |
| 5,551,616 A | 9/1996 | Stitt et al. |
| 5,560,676 A | 10/1996 | Griffith et al. |
| 5,628,439 A | 5/1997 | O'Hara |
| 5,660,310 A | 8/1997 | LeGrow |
| 5,667,272 A | 9/1997 | Sutton |
| 5,973,917 A | 10/1999 | White |
| 6,059,358 A | 5/2000 | Demick et al. |
| 6,102,463 A * | 8/2000 | Swanson et al. ....... 296/37.15 X |
| 6,135,546 A | 10/2000 | Demtchouk |
| 6,139,096 A | 10/2000 | Anderson et al. |
| 6,220,660 B1 | 4/2001 | Bedro et al. |
| 6,540,279 B1 | 4/2003 | Bargiel |
| 6,692,051 B1 | 2/2004 | Cook et al. |
| 6,736,456 B2 * | 5/2004 | Okamoto et al. ......... 297/336 X |
| 6,830,292 B1 | 12/2004 | Yoda |
| 6,860,550 B2 | 3/2005 | Wojcik |
| 6,874,667 B2 | 4/2005 | Dykstra et al. |
| 6,929,306 B2 * | 8/2005 | Mack et al. ................. 296/37.15 |
| 6,955,386 B2 * | 10/2005 | Rhodes et al. ............ 297/334 X |

(Continued)

FOREIGN PATENT DOCUMENTS

JP         60199743 A  * 10/1985

(Continued)

*Primary Examiner* — Anthony D Barfield
(74) *Attorney, Agent, or Firm* — Barnes & Thornburg LLP

(57) ABSTRACT

An automotive seat has a seat back and a seat bottom that are movable between a seating configuration and a work desk configuration. When moving from the seating configuration to the work desk configuration, the seat bottom pivots forwardly into a generally vertical orientation and the seat back pivots downwardly into a generally horizontal orientation. The seat bottom supports an end of the seat back when the seat bottom and the seat back are in the work desk configuration. The back surface of the seat back faces upwardly to provide a work surface when the seat bottom and the seat back are in the work desk configuration. Sufficient space is provided beneath the seat back when in the work desk configuration to accommodate a person's legs underneath the seat back.

19 Claims, 4 Drawing Sheets

| U.S. PATENT DOCUMENTS | | |
|---|---|---|
| 7,303,226 B2 | 12/2007 | Bernstein et al. |
| 7,455,204 B2 | 11/2008 | Lippert et al. |
| 2002/0043826 A1 | 4/2002 | Ingram et al. |
| 2004/0245797 A1 | 12/2004 | Bixby |

| FOREIGN PATENT DOCUMENTS | | | |
|---|---|---|---|
| JP | 03045434 A | * | 2/1991 |
| WO | WO 2008/151087 A2 | | 12/2008 |

* cited by examiner

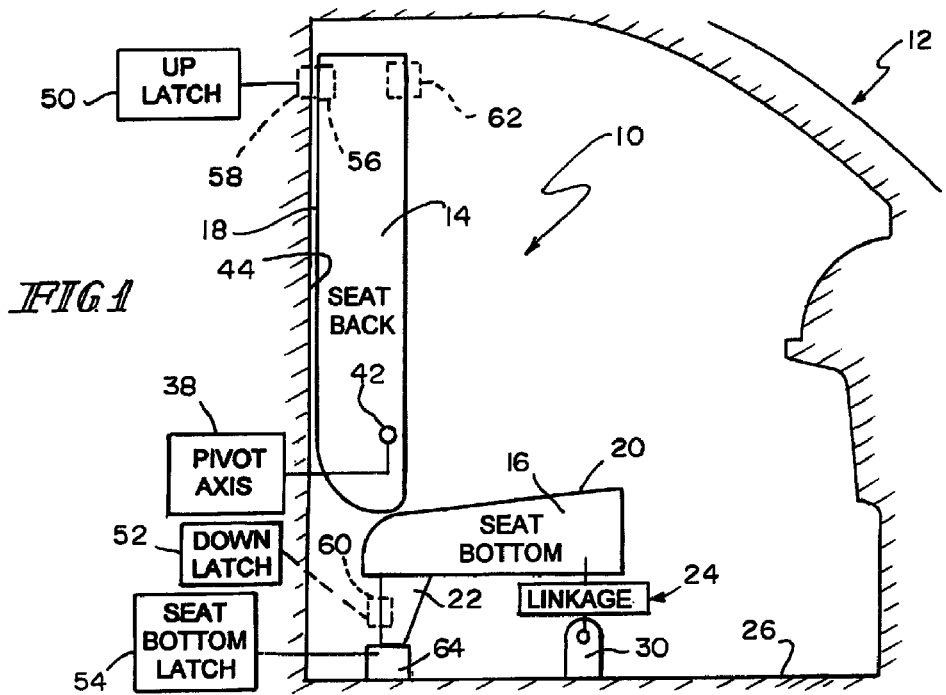
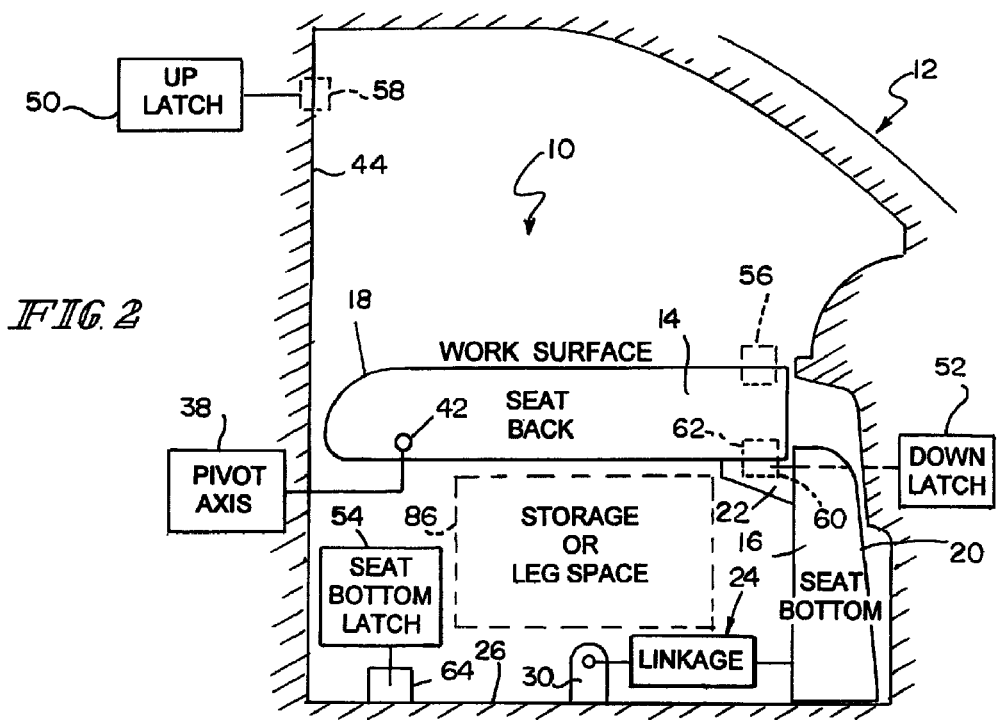

AUTOMOTIVE SEAT RECONFIGURABLE TO WORK DESK

BACKGROUND

The present disclosure relates to automotive seats and particularly to automotive seats that have movable seat backs and seat bottoms. More particularly, the present disclosure relates to automotive seats that are reconfigurable to provide a work surface.

Utility vehicles, such as service vans or trucks, are used by drivers in a wide variety of industries. For example, power companies and telephone companies typically have a fleet of service vans or trucks. Many construction workers, plumbers, electricians, and other repairmen and repairwomen use vans or trucks to carry equipment to a job site. The drivers of these types of vehicles oftentimes have a wide variety of paperwork to fill out and to keep track of in connection with the jobs they perform. Some of these drivers may have lap top computers for data entry and other tasks. These drivers oftentimes consider the cockpit of their vehicle as their personal office or work space. Salesmen and saleswomen who drive cars also may view the cockpits of their vehicles similarly.

SUMMARY

An automotive seat is provided and comprises one or more of the features recited in the appended claims and/or the following features which, alone or in any combination, may comprise patentable subject matter:

An automotive seat for a vehicle may include a seat back and a seat bottom. The seat back may be movable between a raised position in which a back surface of the seat back faces generally toward a rear of the vehicle and a lowered position in which the back surface of the seat back faces upwardly to serve as a work surface. The seat bottom may be movable between a first position in which a seating surface of the seat bottom faces generally upwardly and a second position in which the seating surface faces generally toward a front of the vehicle. The seat bottom may be configured to support the seat back in the lowered position. Thus, the automotive seat is movable between a seating configuration and a work desk configuration.

A linkage may be coupled to the seat bottom and coupled to a floor of the vehicle. The linkage may be situated beneath a front region of the seat bottom and may extend generally vertically upwardly from the floor of the vehicle beneath the front region of the seat when the seat is in the first position. The linkage may comprise a link having a first end coupled to the seat bottom and a second end pivotably coupled to the floor of the vehicle, for example. When moving between the first and second positions, the seat bottom pivots forwardly. Thus, the linkage may extend generally horizontally adjacent the floor of the vehicle when the seat bottom is in the second position.

The seat back may pivot about a generally horizontal pivot axis when moving between the raised position and the lowered position. The seat bottom may have a support member that extends generally downwardly from a rear region of the seat bottom when the seat bottom is in the first position. The support member may extend generally horizontally from the seat bottom when the seat bottom is in the second position such that the seat back may be supported by the support member when the seat back is in the lowered position.

The automotive seat may have a latch configured to releasably secure the seat back to the seat bottom when the automotive seat is in the work desk configuration. The latch may comprise a first portion coupled to the seat bottom and a second portion coupled to the seat back. Another latch may be provided to releasably secure the seat back in the raised position. This additional latch may also comprise a first portion coupled to a top region of the seat back and a second portion coupled to the vehicle.

When the automotive seat is in the work desk configuration, the seat back may be positioned by a sufficient amount above the floor of the vehicle to permit the legs of a person sitting on another seat of the vehicle to fit underneath the seat back. For example, the automotive seat may be the passenger seat of the vehicle and a person sitting sideways on the driver's seat of the vehicle may put their legs beneath the seat back.

The back surface of the seat back may have at least one recess for receiving at least one item therein. The at least one recess may include a recess configured to catch objects left on the work surface when the seat back is moved from the lowered position to the raised position. Additionally or alternatively, the at least one recess may include a recess configured as a cup holder and/or a recess configured to receive a laptop computer.

According to this disclosure, therefore, an automotive seat for a vehicle may include a seat back having a top end and a bottom end and a seat bottom having a rear end and a front end. The seat back and seat bottom may be coupled to the vehicle and moveable between a seating configuration in which the rear end of the seat bottom is situated adjacent the bottom end of the seat back and a work desk configuration in which the rear end of the seat bottom is situated generally vertically above the front end of the seat bottom and in which the top end of the seat back is supported by the seat bottom and is situated adjacent the rear end of the seat bottom.

Methods of making and methods of using the automotive seat are contemplated herein and may comprise patentable subject matter.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the following figures, in which:

FIG. 1 is a block diagram showing a seat back and a seat bottom of an automotive seat in a seating configuration in a vehicle, a linkage coupling a front region of the seat bottom to the floor of the vehicle, and latches releasably securing the seat back and seat bottom in the seating configuration;

FIG. 2 is a block diagram, similar to FIG. 1, showing the seat back and seat bottom of the automotive seat in a work desk configuration, the seat bottom pivoted forwardly, and the seat back pivoted downwardly about a pivot axis such that a back surface of the seat back faces upwardly to provide a work surface, the seat back being supported by a support member extending generally horizontally from the seat bottom, and a latch releasably coupling the seat back and seat bottom together;

DETAILED DESCRIPTION

Figure 3:
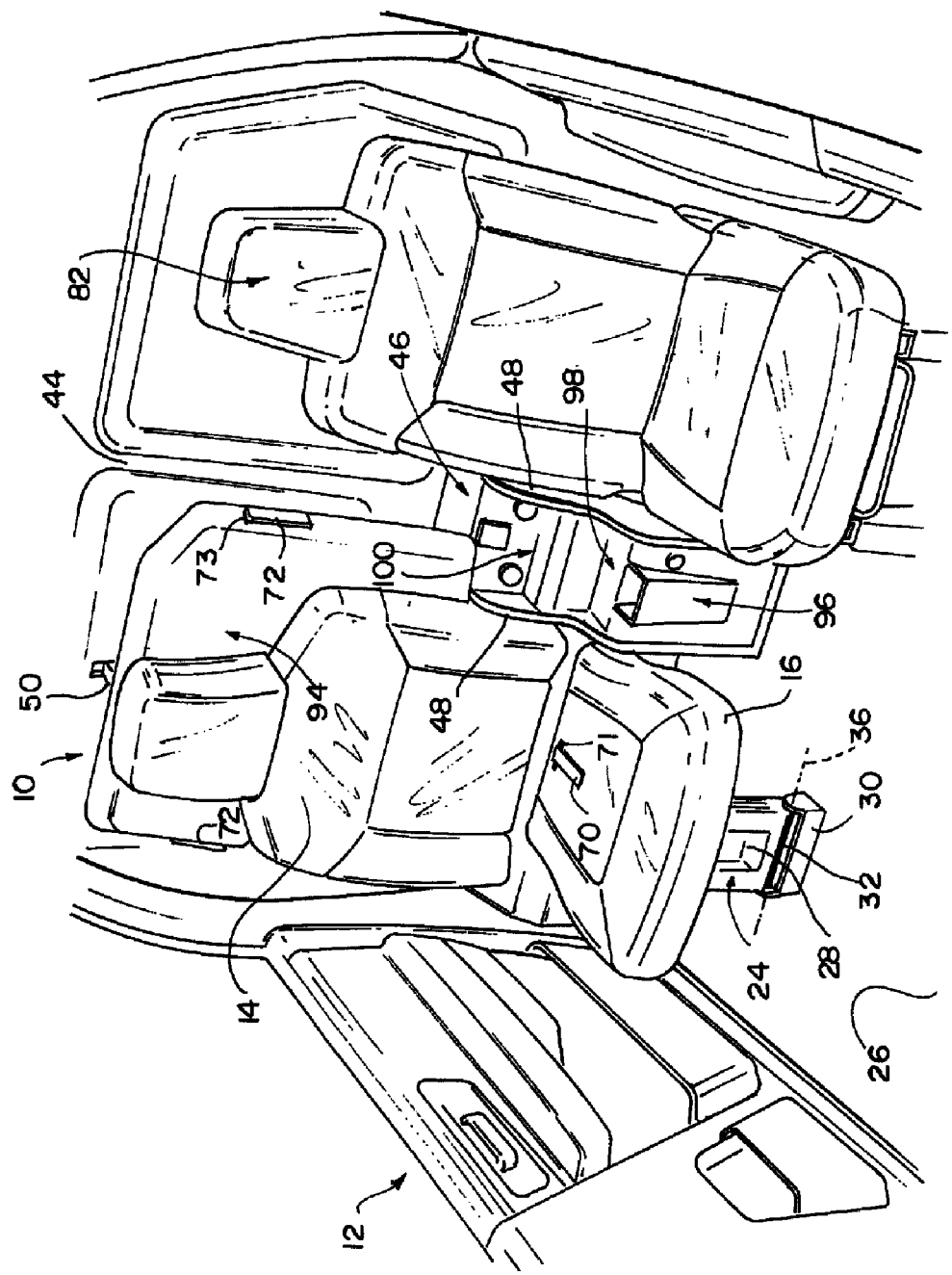
FIG. 3 is a perspective view of a portion of a cockpit of a vehicle showing a driver's seat on the right hand side of the page, a passenger seat on the left hand side of the page having a seat back and a seat bottom in a seating configuration, and a center console situated between the driver's seat and passenger seat.
Figure 4:
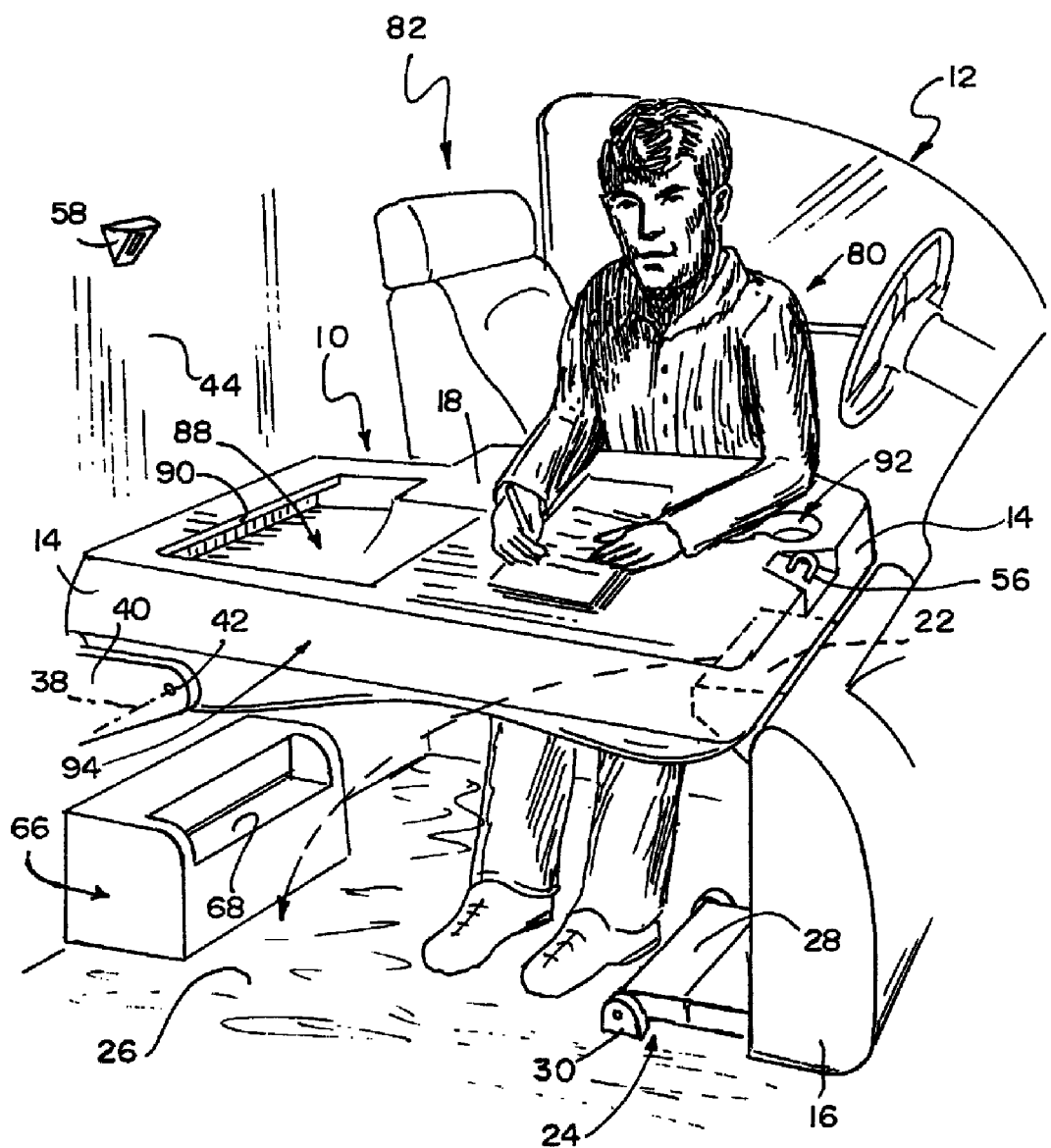
FIG. 4 is a perspective view of the cockpit of the vehicle, from a different viewing angle, showing the passenger seat moved to a work desk configuration having the seat bottom pivoted forwardly and supporting an end of the seat back that has been pivoted downwardly so that a back surface of the seat back can be used as a work surface and showing a person sitting sideways on the driver's seat with their legs situated beneath the seat back of the passenger seat.
Figure 5:
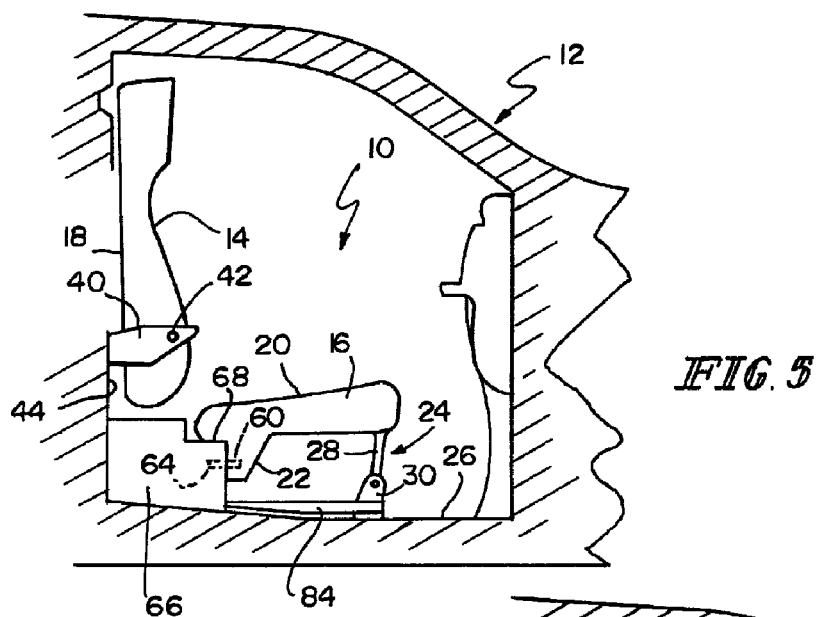
FIGS. 5-7 are side elevation views showing that the sequence of seat bottom and seat back movements to change the automotive seat from the seating configuration, shown in FIG. 5, to the work desk configuration, shown in FIG. 7, includes moving the seat bottom to a generally vertical orientation, shown in FIG. 6, prior to pivoting the seat back downwardly.
Figure 7:
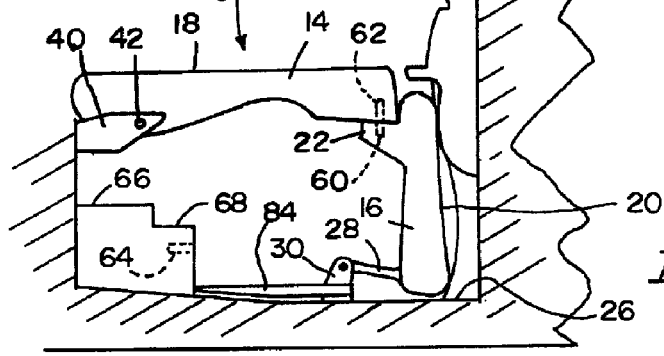

According to this disclosure, an automotive seat 10 for a vehicle 12 is movable between a seating configuration, shown in FIGS. 1, 3, and 5, and a work desk configuration, shown in FIGS. 2, 4, and 7. Seat 10 includes a seat back 14 and a seat bottom 16. Seat back 14 is movable between a raised position in which a back surface 18 of seat back 14 faces generally toward a rear of the vehicle 12 and a lowered position in which back surface 18 faces upwardly to serve as a work surface (referred to herein sometimes as "work surface 18"). Seat bottom 16 is movable between a first position in which a seating surface 20 of seat bottom 16 faces upwardly and a second position in which the seating surface 20 faces generally toward a front of the vehicle 12. Seat bottom 16 has a support member 22 that supports seat back 14 in the lowered position as shown in FIGS. 2 and 7.

A linkage 24 is coupled to seat bottom 16 and is coupled to a floor 26 of vehicle 12. In the illustrative example, linkage 24 is situated beneath a front region of the seat bottom 16 and extends generally vertically upwardly from floor 26 of vehicle 12 beneath the front region of the seat bottom 16 when the seat 10 is in seating configuration as shown in FIGS. 1, 3, and 5. Linkage 24 supports the front region of seat bottom 16 above floor 26 when the seat 10 is in the seating configuration. In the illustrative embodiment, linkage 24 includes a single link 28 having a first end coupled to the seat bottom and a second end pivotably coupled to floor 26 of vehicle 12. In some embodiments, the first end of link 28 is rigidly attached to seat bottom 16. In other embodiments, seat bottom 16 is able to pivot relative to the first end of link 28. It within the scope of this disclosure for linkage 24 to have multiple links that pivot with respect to each other as the seat bottom 16 moves between the first and second positions.

It will be appreciated that seat bottom 16 includes a seat cushion and a fairly rigid seat frame or pan that supports the seat cushion. In some embodiments, support member 22 and link 28 are separate elements that couple to the seat frame or pan. In other embodiments, one or the other or both of support member 22 and link 28 are formed integrally with the seat frame or pan. Thus, such a frame or pan having support member 22 and/or link 28 formed integrally therewith may be molded from a plastics material or stamped or otherwise formed from a metal material. The seat cushion is typically made of foam that is covered by a fabric, leather, or other covering such as a synthetic material.

A pivot mount 30 and pivot pin 32 are provided to pivotably couple the second end of link 28 to floor 26 of vehicle 12 as shown, for example, in FIG. 3. When moving from the first position to the second position, the seat bottom pivots forwardly in the direction of arrow 34, shown in FIG. 6, and link 28 pivots about a pivot axis 36, shown in FIG. 3, which is defined by pivot pin 32. Thus, the linkage 24 includes link 28 that moves from a position extending generally vertically upwardly from floor 26 to a position extending generally horizontally adjacent to the floor 26 of the vehicle 12 as seat bottom 16 moves from the first position to the second position. When changing the configuration of seat 10 from the seating position to the work desk configuration, seat bottom 16 is moved from the first position to the second position prior to moving seat back 14 from the raised position to the lowered position.

When moving between the raised position and the lowered position, seat back 14 pivots about a generally horizontal pivot axis 38, shown in FIG. 4 and shown diagrammatically in FIGS. 1 and 2. Thus, the upper end region of seat back 14 moves in the direction of phantom arrow 35, shown in FIG. 6, when moving from the raised position to the lowered position. A pair of pivot flanges or arms 40, one of which is shown in FIG. 4, extends from a partition wall 44 or other structural member of vehicle 12 on the opposite sides of seat back 14. Each pivot flange 40 has a pivot pin 42 that interconnects flange 40 with seat back 14. Pivot pins 42 define the pivot axis 38 about which seat back 14 pivots. Thus, like seat bottom 16, seat back 14 has a back cushion and a fairly rigid frame or pan. Pivot pins 42 couple arms 40 to the frame or pan of seat back 14.

Vehicle 12 has a center console 46 with a pair of sidewalls 48 as shown in FIG. 3. In some embodiments, the sidewall 48 of center console 46 that is closest to seat back 14 may provide a connection area for one of pivot pins 42 such that one of flanges 40 (i.e., the one that would otherwise be located between seat back 14 and console 46) can be omitted in such embodiments. While arms 40 extend generally horizontally away from partition wall 44 in the illustrative embodiment, it is within the scope of this disclosure for other support structures and/or linkage mechanisms to be provided to support seat back 14 for movement between raised and lowered positions. For example, a support structure, such as an arm or frame member may extend upwardly from the floor 26 in some embodiments and support pivot pins 42 in the same general locations relative to seat back 14 that these pins 42 are located in the illustrative embodiment.

In the illustrative embodiment, pivot axis 38 remains substantially stationary relative to vehicle 12 during movement of seat back 14 between the raised and lowered positions. However, it is within the scope of this disclosure to provide linkage mechanisms having compound motions such that axis 38 moves forward or rearward and/or up and down during movement of seat back 14 between the raised and lowered positions. Such alternative linkage mechanisms may be designed to compensate for vehicle geometry and space constraints, the goal of such linkage mechanisms being to guide and control the movement of the top end region of the seat back 14 into a position to properly mate up with the rear end region of seat bottom 16 when seat bottom 16 is in the second position and seat back 14 is moved from the raised position to the lowered position. While these alternative linkage mechanisms may include a plurality of rigid links that are interconnected to one another for pivoting movement, they may also include telescopic members, track and roller mechanisms, and/or rack and pinion mechanisms, just to name few, in addition to or in lieu of the plurality of rigid links. Linkage 24, discussed above, may also include one or more of these alternative types of linkage mechanisms in some embodiments.

According to this disclosure, therefore, seat 10 includes seat back 14 having a top end and a bottom end and a seat bottom 16 having a rear end and a front end. The seat back 14 and seat bottom 16 are coupled to the vehicle 12 and moveable between a seating configuration in which the rear end of the seat bottom 16 is situated adjacent the bottom end of the seat back 14, as shown in FIGS. 1, 3, and 5, and a work desk configuration in which the rear end of the seat bottom 16 is situated generally vertically above the front end of the seat bottom 16 and in which the top end of the seat back 14 is supported by the seat bottom 16 and is situated adjacent the rear end of the seat bottom 16 as shown in FIGS. 2, 4, and 7.

According to this disclosure, a set of releasable latches is provided to secure the seat back 14 and seat bottom 16 in the seating and work desk configurations. The terms "latch" and "latches," as used herein, are intended to broadly cover any devices which operate to secure two things relative to each other. In the automotive seating industry, such latches oftentimes include a striker wire, sometimes a D-shaped striker wire, and one or more catch members that releasably grip or catch on the striker wire. All such devices are intended to be within the scope of the term "latch" according to this disclosure. Other devices, such as, for example, movable fingers or tabs in combination with lips or edges onto which the fingers or tabs catch are also considered to be latches according to this disclosure. Fairly simple hooks, some which have a leaf spring for enhanced retention, and the associated anchor members to which the hooks releasably attach are also considered to be latches according to this disclosure.

Latches used in the automotive industry are typically released via movement of a lever, a strap, a cable or some other actuator system that acts to move the catch, catches, fingers, or the like out of engagement with the associated striker wire or lip, or that acts to moves another member, such as a keeper which is blocking movement of the catch, finger, etc., to a position no longer blocking movement of the catch, etc. All such release mechanisms for latches are considered to be within the scope of this disclosure for releasing latches, as are latches in which a portion of the latch itself is moved manually by direct manipulation of a portion of the latch mechanism by a person.

In the illustrative embodiment, seat 10 includes first, second, and third latches 50, 52, 54 which are shown diagrammatically in FIGS. 1 and 2 at blocks labeled up latch 50, down latch 52, and seat bottom latch 54. Up latch 50 secures seat back 14 in the raised position relative to partition wall 44. Down latch 52 secures seat back 14 to seat bottom 16 in the work desk configuration. Seat bottom latch 54 secures seat bottom 16 in the first position having seating surface facing generally upwardly.

Up latch 50 includes a first portion 56 coupled to a top region of seat back 14 and a second portion 58 coupled to partition wall 44 of vehicle 12. Down latch 52 includes a first portion 60 coupled to the seat bottom 16 and a second portion 62 coupled to the seat back 14. In some embodiments, first portion 60 of latch 52 is coupled to support member 22 as shown diagrammatically in FIGS. 1 and 2. Seat bottom latch 54, as shown in FIGS. 1 and 2 includes a first portion 64 and a second portion which is discussed in further detail below. In the illustrative embodiment, latch 50 includes a D-shaped striker wire which serves as first portion 56, as shown in FIG. 4, and a housing and catch member assembly which serves as second portion 58. Thus, housing and catch member assembly 58 includes one or more catch members that releasably grip wire 56 when seat back 14 is moved to the raised position.

In some embodiments, the second portion of latch 54 is coupled to support member 22 and is a separate latch portion from portion 60 of latch 52. In other embodiments, seat 10 is appropriately configured such that first portion 60 of latch 52 also serves as the second portion of latch 54. For example, as shown in FIGS. 4-7, a floor box 66 is mounted to floor 26 of vehicle 12 and includes an upwardly facing shelf surface 68 that supports a rear end region of seat bottom 16 when seat bottom 16 is in the first position as shown in FIG. 5. First portion 64 of latch 54 is coupled to box 66 in some embodiments, as shown diagrammatically in FIGS. 5 and 7, and is positioned to interact with portion 60 of latch 52 when seat bottom 16 is in the first position. Then, when seat bottom 16 is moved to the second position, portion 60 of latch 52 is positioned and arranged to interact with portion 62 of latch 52. Thus, it is contemplated by this disclosure, for example, that portion 60 of latch 52 may comprises one or more catch members and that portions 62, 64 of respective latches 52, 54 may comprise striker wires that are gripped by the catch members of portion 60 of latch 52.

As shown in FIG. 3, a pull strap 70 is provided to release latch portion 60 from latch portion 64 and, in those embodiments in which latch portion 60 also interconnects to latch portion 62, to release latch portion 60 from latch portion 62. Strap 70 is routed through a slot 71 provided in seat bottom 16 and interconnects to movable members, such as catch members in some embodiments, of latch portion 60. A similar pair of pull straps 72, shown in FIG. 3, is provided to release latch portion 56 from latch portion 58 of latch 50. Straps 72 are routed through respective slots 73 provided in seat back 14. It will be appreciated, therefore, that in the FIG. 3 embodiment, the movable catch members are coupled to seat back 14 and that the striker wire is coupled to partition wall 44. Thus, the FIG. 3 embodiment of latch 50 has the latch components reversed as compared to the FIG. 4 embodiment. Such a reversal of latch components is contemplated as being within the scope of this disclosure for all latch embodiments discussed herein.

Integrating latch mechanisms into the pivot connections of seat 10 are also contemplated by this disclosure. Accordingly, in other embodiments of seat 10 contemplated by this disclosure, one latch may be integrated into the pivot connection between seat back 14 and one of arms 42 and another latch may be integrated into the pivot connection between linkage 24 and pivot mount 30. Each of such integrated latches, in such alternative embodiments, is contemplated as latching or engaging at two positions. Such latches, therefore, may comprise a rotatable plate or hub having notches provided therein at appropriate positions for receipt of a pin, catch, finger, or other member to prevent rotation of the rotatable plate or hub. For example, a latch integrated into the pivot connection between seat back 14 and one of arms 42 latches or engages when seat back 14 is located at the raised position and at the lowered position. In a similar manner, a latch integrated into the pivot connection between linkage 24 and support 30 latches or engages when seat bottom 16 is at the first position or the second position.

According to this disclosure, seat back 14 pivots at least 90 degrees and, in some embodiments, up to 100 degrees or more, when moving between the raised and lowered positions. Further according to this disclosure, seat bottom 16 and linkage 24 pivot at least 90 degrees and, in some embodiments, up to 100 degrees or more, when moving between the first and second positions. In those embodiments having latches integrated into the pivot connection between seat back 14 and arms 40 and the pivot connection between linkage 24 and pivot mount 30, the amount of angular movement of seat back 14 and seat bottom 14 dictates the angular amount by which the notches are spaced on the respective rotatable plates or hubs.

When the seat 10 is in the work desk configuration, seat back 14 is supported by arms 40 and support member 22 of seat bottom 16 so as to be positioned by a sufficient amount above floor 26 of vehicle 12 to permit the legs of a person 80 sitting on driver's seat 82 of the vehicle to fit underneath the seat back 14 as shown in FIG. 4. This is possible, in the illustrative embodiment, because seat bottom 16 has shifted by a sufficient distance, such as on the order of about 12 inches to about 24 inches or so, toward the front of vehicle 12 when moving from the first position to the second position. The fact that pivot axis 38 of seat back 14 is located by a noticeable distance upwardly from the very bottom end of seat back 14, such as on the order of about 6 inches to about 12 inches or so when seat back 14 is in the raised position, also contributes to the creation of the large space 86 by ensuring that seat back 14 is supported high enough from floor 26 when in the lowered position to accommodate the knees and lower legs of person 80 thereunder.

Figure 6:
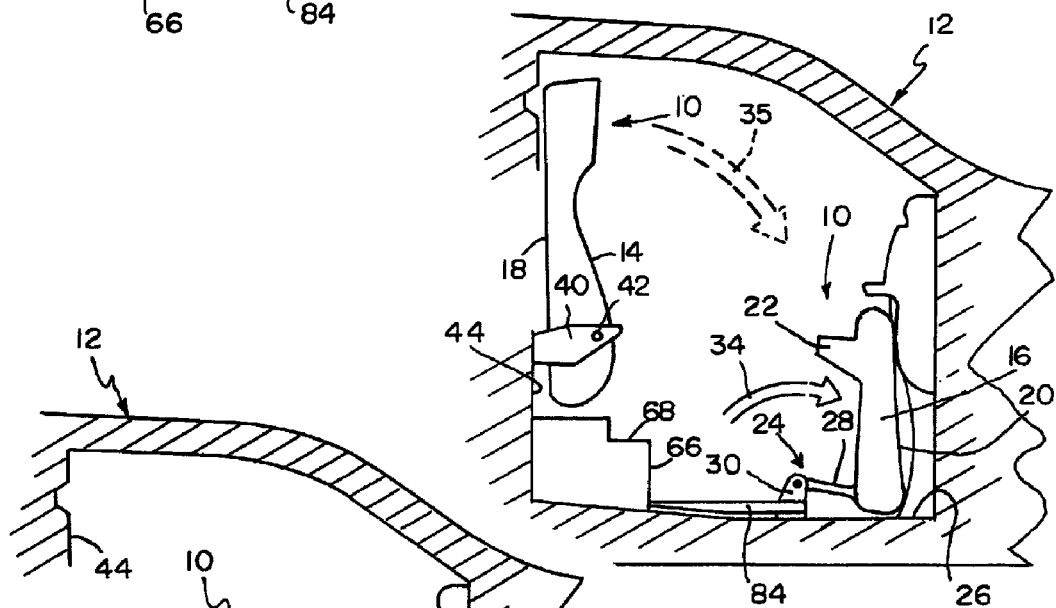

Thus, a large amount of storage or leg space 86, shown diagrammatically in FIG. 2, is provided beneath seat back 14 when seat 10 is in the work desk configuration due to the evacuation of seat bottom 16 from the space it otherwise occupies when seat 10 is in the seating configuration and due to the amount that seat back 14 is elevated above floor 26 when in seat 10 is in the work desk configuration. In some embodiments in which some or all of floor 26 is inclined, as shown in FIGS. 5-7, or otherwise does not have a flat surface, a foot rest plate or panel 84 is provided between pivot mount 30 and floor box 84. Panel 84 is configured to provide person 80 with a relatively planar, in some cases generally horizontal, surface on which to place their feet when using seat 10 as a work desk. In some embodiments, the upper surface of panel 84 is textured, such as being roughened or formed with ridges or ribs of any desired shape or pattern, or by having a non-slip layer or carpeting attached to the upper surface of panel 84.

The work desk configuration of seat 10 according to this disclosure is a much more ergonomic arrangement than is believed to be known in the prior art and, when seat 10 is used as a work desk as shown in FIG. 4, person 80 is able to use work surface 18 while seated in a position which is more comfortable and which is more akin to the manner in which a person would sit at a desk in an office. In fact, some drivers such as those that oftentimes make solo service or delivery runs, may even opt to keep seat 10 in the work desk configuration most of the time and only convert seat 10 into the seating configuration on those rare occasions when a passenger will also be riding in the vehicle 12.

In some embodiments, work surface 18 of seat back 14 has at least one recess for receiving at least one item therein. The at least one recess may include, for example, a relatively large recess 88 provided in the end region of seat back 14 which is near partition wall 44 as shown in FIG. 4. Recess 88 is configured to catch objects that are left on work surface 18 when the seat back is moved from the lowered position to the raised position. A portion of work surface 18 provides a catch lip 90 that overhangs recess 88 by a short distance, such as on the order of about 1 inch to about 4 inches. As seat back 14 is moved from the lowered position to the raised position, objects on left on work surface 18 will have tendency to slide into recess 88 and move toward the bottom recess to be retained by catch lip 90.

Recess 88 may also have items placed therein intentionally during use of seat 10 as a work desk. For example, a lap top computer can be placed within recess 88 during use or for storage, as desired. In other embodiments, a separate recess in work surface 18 is sized and configured to receive a laptop computer. In the illustrative embodiment shown in FIG. 4, a recess 92 is sized and configured as a cup holder. Other recess configured to hold other items are within the scope of this disclosure as well. For example, one or more recesses for holding tools, pens, pencils, staplers, scissors, and other work items may be provided in work surface 18 according to this disclosure.

In the illustrative example shown in FIGS. 3 and 4, a desk top portion 94 of seat back 14 is molded from a plastics material, such as via a blow molding or vacuum molding process or any other plastics molding process, and one side of desk top portion 94 extends beyond the side edge of the back rest cushion of seat back 14 so as to overhang part of center console 46 when seat 10 is in the seating configuration as shown in FIG. 3. This extension or overhanging portion of desk top portion 94 provides an expanded area of work surface 18 that extends from the remainder of desk top portion 94 toward person 20 when seat 10 is in the work desk configuration as shown in FIG. 4. The extension portion of desk top portion 94 is omitted in other embodiments.

In the illustrative example of FIG. 3, center console 46 extends only part way toward the front of vehicle 12 between seat 10 and seat 82. This is another aspect of vehicle 12 that contributes to the ability of the leg's of person 80 to fit within space 86 when seat 10 is in the work desk configuration. However, center console 46 is equipped with a drawer 96 which can be slid opened further into the space between seat 10 and seat 82 for storage of additional work items, such as papers, file folders, and so forth. Center console 46 has first and second additional recesses 98, 100 arranged in a stepped or tiered configuration as shown in FIG. 3 for storage of additional items, if desired.

Although certain illustrative embodiments have been described in detail above, variations and modifications exist within the scope and spirit of this disclosure as described and as defined in the following claims.

The invention claimed is:

1. An automotive seat for a vehicle, the automotive seat comprising a seat back having a top end and a bottom end with a pivot axis closer to the bottom end than to the top end, the seat back being pivotable about the pivot axis between a raised position in which a back surface of the seat back faces generally toward a rear of the vehicle and a lowered position in which the back surface of the seat back faces upwardly to serve as a work surface, a seat bottom movable between a first position in which the seat bottom is generally horizontally oriented with a seating surface of the seat bottom facing generally upwardly and a second position in which the seat bottom is generally vertically oriented with the seating surface facing generally toward a front of the vehicle, the seat bottom being configured to support the seat back in the lowered position, wherein when the seat back is in the lowered position and the seat bottom is in the second position the automotive seat is in a work desk configuration in which sufficient space is provided beneath the seat back to permit legs of a person seated on an adjacent seat of the vehicle to fit underneath the seat back, and wherein the pivot axis lies in a plane above the seat bottom in the second position, and a latch configured to releasably secure the seat back to the seat bottom when the seat bottom is in the second position supporting the seat back in the lowered position.

2. The automotive seat of claim 1, further comprising a linkage coupled to the seat bottom and coupled to a floor of the vehicle, the linkage being situated beneath a front region of the seat bottom when the seat bottom is in the first position.

3. The automotive seat of claim 2, wherein the linkage extends generally vertically upwardly from the floor of the vehicle beneath the front region of the seat when the seat is in the first position and the linkage extends generally horizontally adjacent the floor of the vehicle when the seat bottom is in the second position.

4. The automotive seat of claim 2, wherein the linkage comprises a link having a first end coupled to the seat bottom and a second end pivotably coupled to the floor of the vehicle.

5. The automotive seat of claim 1, wherein the pivot axis is generally horizontal.

6. The automotive seat of claim 1, wherein the seat bottom has a support member that extends generally downwardly from a rear region of the seat bottom when the seat bottom is in the first position, the support member extends generally horizontally from the seat bottom when the seat bottom is in the second position, and the seat back is supported by the support member when the seat back is in the lowered position.

7. The automotive seat of claim 1, wherein the latch comprises a first portion coupled to the seat bottom and a second portion coupled to the seat back.

8. The automotive seat of claim 1, further comprising a second latch to releasably secure the seat back in the raised position.

9. The automotive seat of claim 8, wherein the second latch comprises a first portion coupled to a top region of the seat back and a second portion coupled to the vehicle.

10. The automotive seat of claim 8, wherein the latch comprises a first portion coupled to the seat bottom and a second portion coupled to the seat back.

11. The automotive seat of claim 1, wherein the back surface of the seat back has at least one recess for receiving at least one item therein.

12. The automotive seat of claim 11, wherein the at least one recess includes a first recess configured to catch objects left on the work surface when the seat back is moved from the lowered position to the raised position.

13. The automotive seat of claim 11, wherein the at least one recess includes a recess configured as a cup holder.

14. The automotive seat of claim 11, wherein the at least one recess includes a recess configured to receive a laptop computer.

15. An automotive seat for a vehicle, the automotive seat comprising
a seat back having a top end, a bottom end, a front surface and a back surface,
a seat bottom having a rear end, a front end, and a seating surface,
wherein the seat back and seat bottom are coupled to the vehicle and moveable between a seating configuration in which the rear end of the seat bottom is situated adjacent the bottom end of the seat back and a work desk configuration in which the rear end of the seat bottom is situated generally vertically above the front end of the seat bottom and in which the top end of the seat back is supported by the seat bottom and is situated adjacent the rear end of the seat bottom, wherein when the seat back and the seat bottom are in the work desk configuration the back surface is above the seating surface and sufficient space is provided beneath the seat back to permit legs of a person seated on an adjacent seat of the vehicle to fit underneath the seat back, and
a latch configured to releasably secure the seat back to the seat bottom when the seat bottom and the seat back are in the work desk configuration.

16. The automotive seat of claim 15, further comprising a linkage that is coupled to the seat bottom near the front end and that is pivotably coupled to a floor of the vehicle, the linkage extending generally vertically and supporting the front end of the seat bottom above the floor when the seat back and seat bottom are in the seating configuration, and the linkage extending generally horizontally along the floor when the seat back and seat bottom are in the work desk configuration.

17. The automotive seat of claim 16, wherein the seat bottom has a support member extending from the seat bottom near the rear end, the support member extending downwardly when the seat back and the seat bottom are in the seating configuration, the support member extending generally horizontally when the seat back and the seat bottom are in the work desk configuration, and the top end of the seat back being supported atop the support member when the seat back and the seat bottom are in the work desk configuration.

18. The automotive seat of claim 17, further comprising a wherein the latch has a first portion coupled to the seat back near the top end and a second portion coupled to seat bottom near the rear end.

19. An automotive seat coupled to the floor of a vehicle, the automotive seat comprising
a seat back having a top end, a bottom end, a back surface and a front surface for supporting a person seated in the automotive seat,
a seat bottom having a rear end, a front end, and a seating surface,
wherein the seat bottom is movable between a seating position in which the seat bottom is generally horizontally oriented with the seating surface of the seat bottom facing generally upwardly and a work desk position in which the seat bottom is generally vertically oriented with the seating surface facing generally toward a front of the vehicle and in which the seat back is generally horizontal and the portion of the seat back at the intersection of the front surface and top end is next to the rear end of the seat bottom, and
a latch configured to releasably secure the seat back to the seat bottom when the seat bottom and the seat back are in the work desk position.

* * * * *